United States Patent
Chung et al.

(10) Patent No.: US 9,854,077 B2
(45) Date of Patent: Dec. 26, 2017

(54) MOBILE TERMINAL AND METHOD FOR CONTROLLING THE SAME

(71) Applicant: LG ELECTRONICS INC., Seoul (KR)

(72) Inventors: Hoseok Chung, Seoul (KR); Seyun Hwang, Seoul (KR); Wonseok Na, Seoul (KR); Kyungji Lee, Seoul (KR); Hyunju Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/040,796

(22) Filed: Feb. 10, 2016

(65) Prior Publication Data

US 2017/0054836 A1    Feb. 23, 2017

(30) Foreign Application Priority Data

Aug. 21, 2015    (KR) .................. 10-2015-0118222

(51) Int. Cl.
*H04B 1/38* (2015.01)
*H04M 1/02* (2006.01)
*H04B 1/3827* (2015.01)

(52) U.S. Cl.
CPC ........ *H04M 1/0277* (2013.01); *H04B 1/3833* (2013.01); *H04M 1/0266* (2013.01)

(58) Field of Classification Search
CPC .. H04M 1/0277; H04M 1/0266; H04B 1/3833
USPC ........................................................ 455/566
See application file for complete search history.

(56) References Cited

U.S. PATENT DOCUMENTS

| | | | |
|---|---|---|---|
| 2010/0128449 A1* | 5/2010 | Mangaroo | G06F 1/1626 361/752 |
| 2011/0003623 A1* | 1/2011 | Na et al. | H01Q 1/243 455/575.1 |
| 2013/0016484 A1 | 1/2013 | Yoo | |
| 2013/0292270 A1* | 11/2013 | Lach et al. | A45C 11/00 206/37 |

FOREIGN PATENT DOCUMENTS

| | | |
|---|---|---|
| JP | 2001-168570 | 6/2001 |
| JP | 2006-185949 | 7/2006 |
| JP | 2010-192756 | 9/2010 |
| JP | 2014-170830 | 9/2014 |

OTHER PUBLICATIONS

International Search Report dated May 23, 2016 issued in Application No. PCT/KR2016/001078.

* cited by examiner

*Primary Examiner* — Raj Chakraborty
(74) *Attorney, Agent, or Firm* — KED & Associates LLP

(57) ABSTRACT

The present invention relates to a mobile terminal and a method of fabricating the same. The mobile terminal includes a frame made of a metal and provided within a terminal body, a printed circuit board spaced apart from one surface of the frame and having various electronic components mounted thereon, and a shield can disposed on the printed circuit board in a manner of facing the frame, and capable of shielding electromagnetic waves by covering the electronic components, wherein the shield can is provided with a ground unit that is formed at least one region and protruding toward the frame so as to be electrically connected to the frame.

7 Claims, 10 Drawing Sheets

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2015-0118222, filed on Aug. 21, 2015, the contents of which is incorporated by reference herein in its entirety.

BACKGROUND OF THE INVENTION

1. Field of the Invention

This specification relates to a mobile terminal capable of extending a ground region by a simple structure, and a method for fabricating the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In general, a shield can is used to shield electromagnetic waves generated by components within the terminal. The shield can is typically made of a metal, and accordingly needs a structure for dissipating the electromagnetic waves.

In the related art, a gasket is disposed at a predetermined region of the shield can such that the shield can comes in contact with a frame, which the shield can faces. The gasket electrically connects the shield can and the frame to each other to radiate the electromagnetic waves to outside via the shield can.

SUMMARY OF THE INVENTION

Therefore, an aspect of the detailed description is to solve the aforementioned problem and other drawbacks. Another aspect of the detailed description is to provide a mobile terminal, capable of extending a ground region using a conventional shield can, and a method of fabricating the same.

To achieve these and other advantages and in accordance with the purpose of this specification, as embodied and broadly described herein, there is provided a mobile terminal including a frame made of a metal and provided within a terminal body, a printed circuit board spaced apart from one surface of the frame and having various electronic components mounted thereon, and a shield can disposed on the printed circuit board in a manner of facing the frame, and capable of shielding electromagnetic waves by covering the electronic components, wherein the shield can is provided with a ground unit that is formed at at least one region and protruding toward the frame so as to be electrically connected to the frame.

In one aspect of the present invention, the ground unit may include a contact portion brought into surface-contact with the frame, and a connecting portion connecting the shield can the contact portion to each other.

In one aspect of the present invention, the connecting portion may be provided by at least one, and extend from a main surface portion of the shield can.

In one aspect of the present invention, through holes may be formed between the ground unit and the main surface portion.

In one aspect of the present invention, the contact portion may be formed parallel to the main surface portion.

In one aspect of the present invention, the connecting portion may be inclined from the main surface portion toward the contact portion.

In one aspect of the present invention, the terminal body may include a front case supporting a display unit, a rear case provided beneath the front case to limit an installation space of a plurality of components along with the front case, and a rear cover covering a rear surface of the rear case. The frame may be integrally formed with the front case.

In one aspect of the present invention, the connecting portion may be symmetric based on a center of the contact portion.

In one aspect of the present invention, the contact portion may be formed in a polygonal, circular or oval shape, or in combination thereof.

In one aspect of the present invention, the connecting portion may be formed at each of edges or vertices of the polygon when the contact portion has the polygonal shape.

In one aspect of the present invention, each of the connecting portions may be formed to have the same angle from a center of the circle or oval when the contact portion has the circular or oval shape.

To achieve these and other advantages and in accordance with the purpose of this specification, as embodied and broadly described herein, there is provided a method for fabricating a mobile terminal, which includes a frame made of a metal, a printed circuit board spaced apart from one surface of the frame and having various electronic components mounted thereon, and a shield can disposed on the printed circuit board and having a flat main surface portion, the method including forming a plurality of through holes at the shield can to form a contact portion having a predetermined area and a connecting portion connecting the contact portion and the shield can, pressing the contact portion to protrude from the main surface portion, and coupling the contact portion and the frame in a closely-adhering manner.

In one aspect of the present invention, a gap between the frame and the main surface portion may be shorter than a gap between the contact portion and the main surface portion, such that the contact portion is elastically brought into contact tightly with the frame.

Effects of a mobile terminal and a fabricating method thereof according to the present invention will be described as follows.

In accordance with at least one of embodiments of the present invention, a shield can may operate as a ground by electrically connecting the shield can to a metal frame, by virtue of a contact portion of the shield can brought into contact with the metal frame, and a connecting portion connecting the contact portion to a main surface portion of the shield can, which may result in forming and extending a ground region of an antenna.

In accordance with at least one of embodiments of the present invention, electromagnetic waves can be dissipated through an extended ground region, thereby enhancing efficiency of the antenna.

In accordance with at least one of embodiments of the present invention, a shield can which is made of a hard material without elasticity can be changed into a type of spring with the elasticity, and the shield can and the frame can be electrically connected to each other.

In accordance with at least one of embodiments of the present invention, a surface-contact can be implemented by a contact portion having a predetermined area, which allows for transfer of sufficient electrons, rather than a point-contact through hooks or a line-contact through C-clips, thereby allowing a smooth flow of current.

In addition, without employing a gasket, a cost reduction and a simplification of an assembly process can be achieved. Also, a shield can fabrication may be included in a metal press process, and accordingly additional fabrication cost may not be required.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
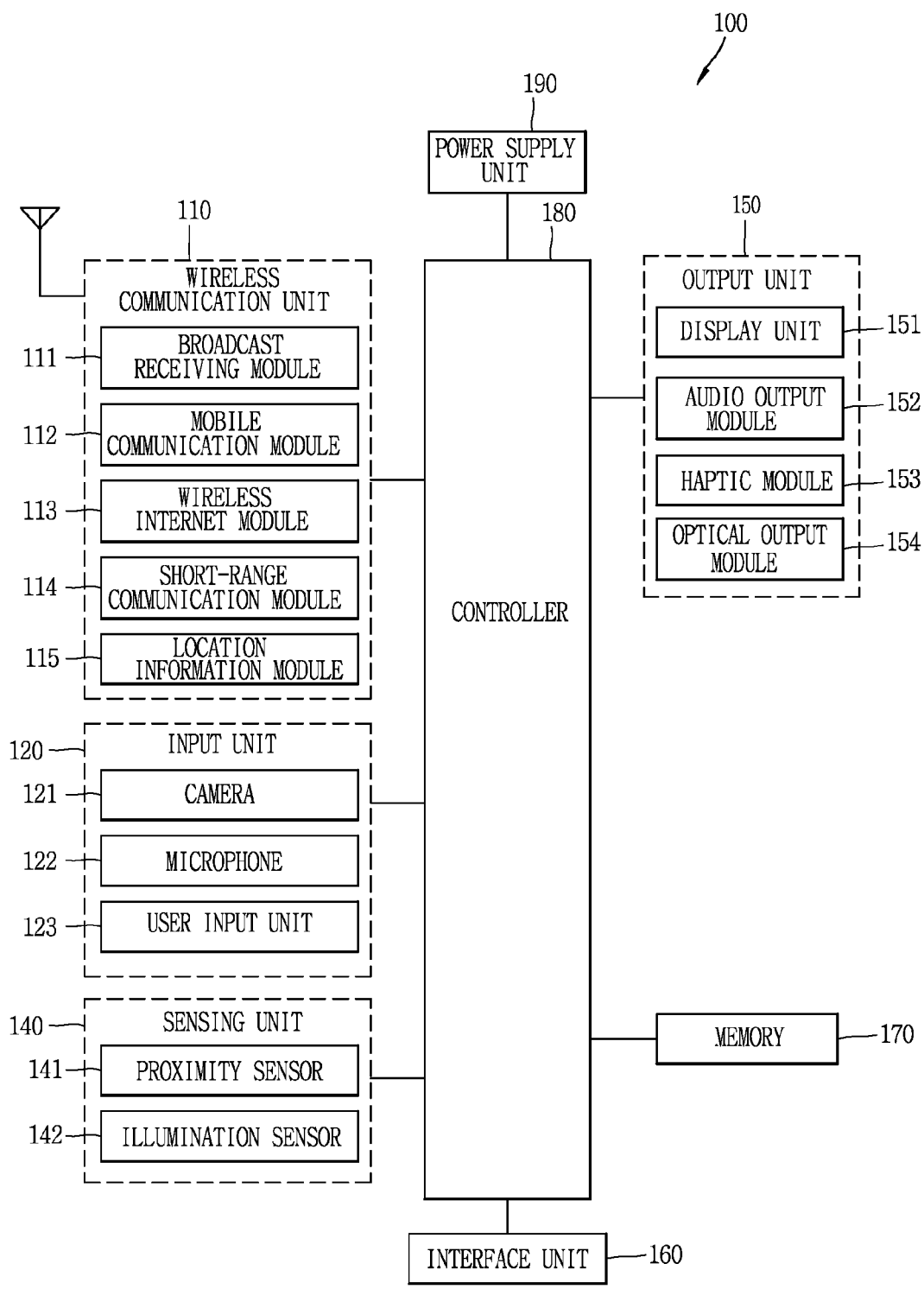
FIG. 1A is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1B:
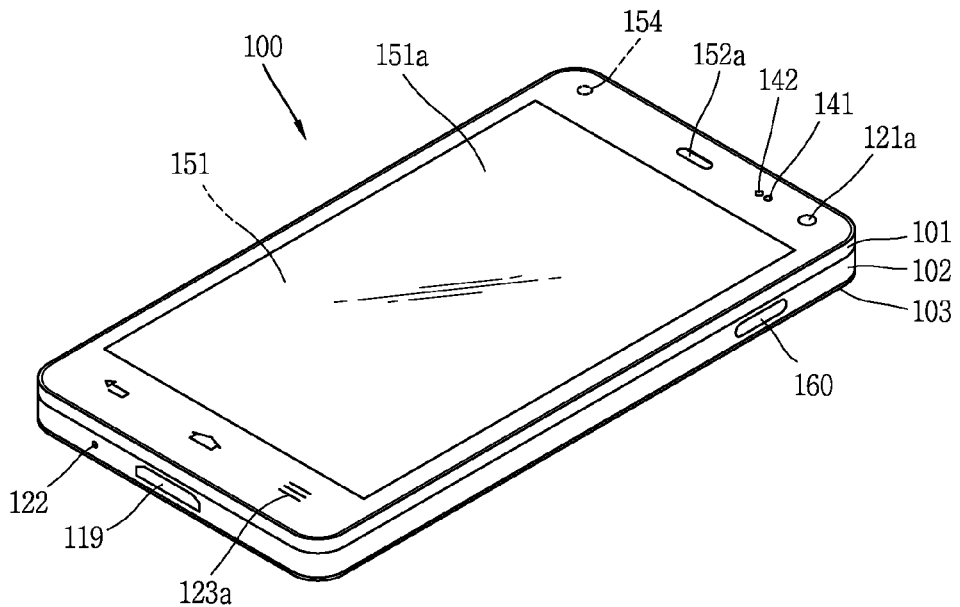
FIGS. 1B and 1C are conceptual views illustrating one example of the mobile terminal, viewed from different directions.
Figure 1C:
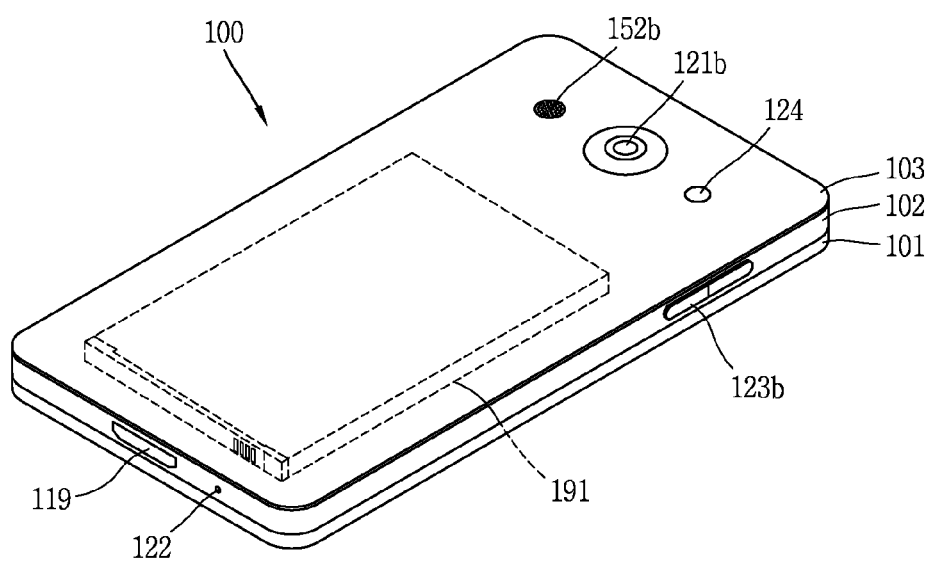

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display (not illustrated) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 may be configured to receive user's voice and other sounds. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*.

The second camera 121*b* can include a plurality of lenses arranged along at least one line. The plurality of lenses may also be arranged in a matrix configuration. The cameras may be referred to as an 'array camera.' When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments which can be implemented in the mobile terminal having such configuration will be described with reference to the accompanying drawings. It is obvious to those skilled in the art that the present disclosure can be specified into other particular forms without departing from the spirit and essential features of the present disclosure.

Figure 2:
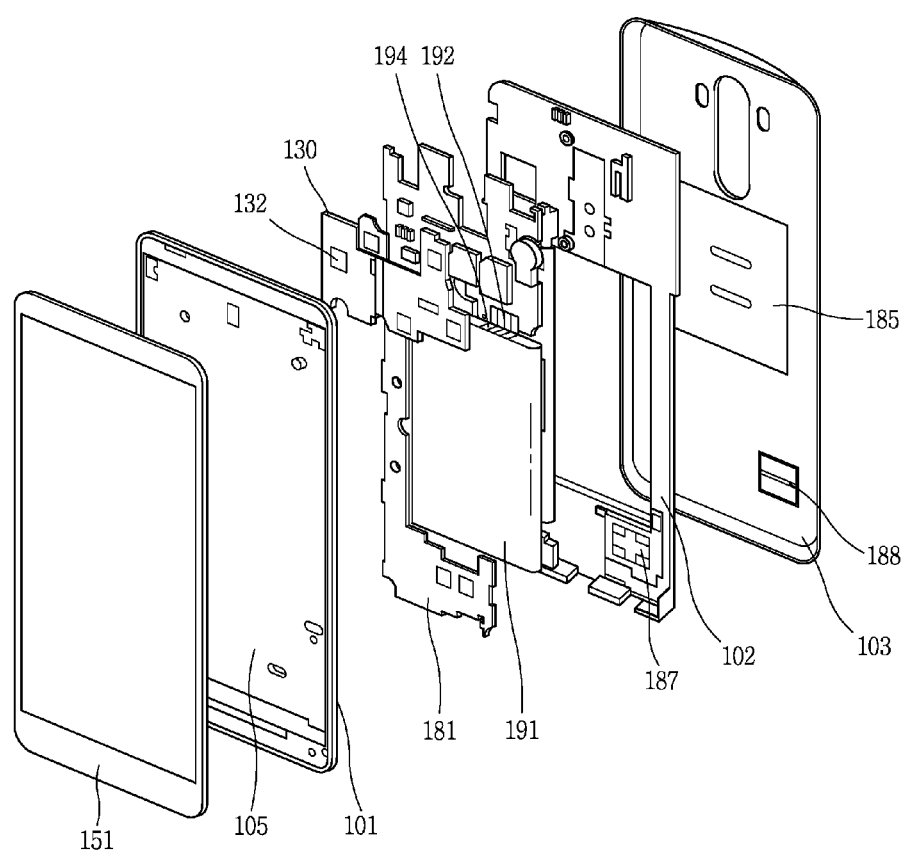
FIG. 2 is an exploded perspective view of a mobile terminal in accordance with one exemplary embodiment of the present invention.
Figure 3:
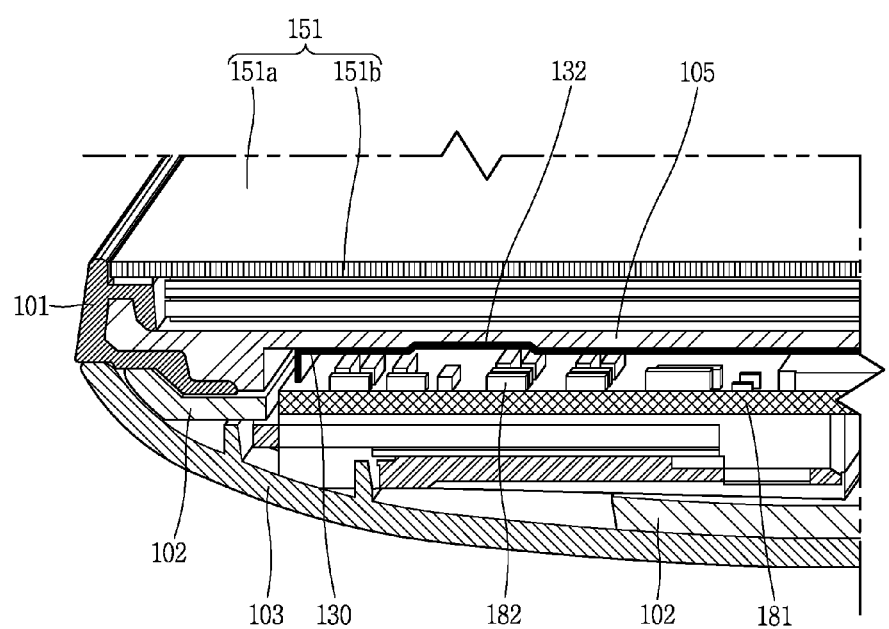
FIG. 3 is a cut sectional view of a mobile terminal including a ground unit in accordance with the one exemplary embodiment of the present invention.

FIG. 2 is an exploded perspective view of a mobile terminal 100 in accordance with one exemplary embodiment of the present invention, and FIG. 3 is a cut sectional view of the mobile terminal 100 including a ground unit 132 in accordance with the one exemplary embodiment of the present invention.

Hereinafter, one exemplary embodiment of the present invention will be described with reference to FIGS. 2 and 3.

One exemplary embodiment of the present invention proposes a method of extending a ground region for static electricity and current generated from an antenna device by use of a shield can 130, which prevents electromagnetic waves generated from electronic components 182 from being radiated to outside.

The mobile terminal 100 according to the one exemplary embodiment of the present invention may include a frame 105 defining a part of a terminal body, a printed circuit board 181 spaced apart from one surface of the frame 105 and having various electronic components 182 mounted thereon, and a shield can 130 provided on the printed circuit board 181 in a manner of facing the frame 105, and capable of blocking electromagnetic waves by shielding the electronic components 182.

The shield can 130 may be provided at at least one region, and include a ground unit 132 which protrudes to come in contact with the frame 105 and is electrically connected to the frame 105. This may result in an extension of the ground region.

FIG. 2 exemplarily illustrates that the frame 105 defines the part of the body of the mobile terminal 100, but the present invention may not be necessarily limited to this. It may be available if the frame 105 is a component electrically connected to the printed circuit board 181. However, the frame 105 is used as the component electrically connected to the printed circuit board 181 because the frame 105 is thin enough to support the mobile terminal 100 and typically used in the mobile terminal 100. Therefore, the frame 105 does neither have to form the appearance of the terminal body nor have to be a member supporting the mobile terminal 100. It may be available if the frame 105 has an area great enough to dissipate current and allow for a flow of current by being electrically connected to the printed circuit board 181.

The mobile terminal 100 according to the one exemplary embodiment may include a case (e.g., frame, housing, cover, etc.) defining appearance. The mobile terminal 100 may include a front case 101 and a rear case 102.

Various electronic components 182 may be arranged within an inner space which is formed by coupling the front case 101 and the rear case 102 to each other. The electronic components 182 may be mounted on one surface or both surfaces of the printed circuit board 181. That is, the front case 101 may have a shape of a rectangular ring disposed beneath the display unit 151. The frame 105 may be disposed in the front case 101 to be flush with the front case 101.

However, the integral formation of the frame 105 with the front case 101 is merely illustrative. Alternatively, the front case 101 may have a shape corresponding to the display unit 151 and the frame 105 may be provided as a member separate from the front case 101. For example, the frame 105 may additionally be disposed between the front case 101 and the rear case 102. Also, FIG. 2 illustrates that the frame 105 is disposed at a front surface of the printed circuit board 181 but may alternatively be disposed at a rear surface of the printed circuit board 181. When the frame 105 is disposed at the rear surface of the printed circuit board 181, it may be understood that those various electronic components 182 are provided on both surfaces of the printed circuit board 181.

The display unit 151 may include a window 151*a* and a display module 151*b*. The window 151*a* may be coupled to one surface of the front case 101. The window 151*a* may be provided with a touch sensor (not illustrated). The touch sensor may be configured to be sensitive to a touch input and be transparent. The touch sensor may be disposed on an entire surface of the window 151*a* to convert changes in a voltage and the like generated at a specific portion of the window 151*a* into electric input signals.

The display unit 151*b* may be disposed on a rear surface of the window 151*a*. This embodiment illustrates a thin film transistor-liquid crystal display (TFT-LCD) as an example of the display module 151*b*, but the present invention may not be necessarily limited to this.

For example, the display module may be implemented as an LCD, an organic light-emitting diode (OLED), a flexible display, a 3D display and the like.

The printed circuit board 181 may be mounted beneath the display module 151*b*. At least one electronic device may be mounted on a lower surface and/or an upper surface of the printed circuit board 181.

The rear case 102 may be provided with an accommodating portion which is recessed to accommodate the battery 191 therein. A contact terminal 192 (see FIG. 7) may be connected to the printed circuit board 181 such that power can be supplied to the terminal body from the battery 191. Contact pins 193 provided at the contact terminal 192 may be brought into contact with an electrode 194 (see FIG. 2) formed on an upper end of the battery 191 such that power can be supplied from the battery 191 to the printed circuit board 181.

A sound output unit 187 may be provided at a lower end of the rear case 102, and an audio output hole 188 may be formed at the rear cover 103 corresponding to the sound output unit 187.

An antenna module (not illustrated) may be provided at an upper end or lower end of the mobile terminal 100.

In general, an LTE/WCDMA Rx Only antenna, a GPS antenna, a BT/WiFi antenna and the like are provided at the upper end of the mobile terminal 100, and a main antenna is provided at the lower end of the mobile terminal 100. Also, an NFC antenna 185 may be disposed at an inner side of the rear cover 103 of the mobile terminal 100.

Also, the antenna module may be provided in plurality, and the plurality of antenna modules may be disposed at each end portion of the terminal, and each antenna module may transmit and receive wireless signals of different frequency bands.

In this instance, the frame 105 may be made of a metal so as to maintain sufficient rigidity even if the frame 105 is thin. The metal frame 105 may operate as a ground. That is, the printed circuit board 181 or the antenna module may be connectable to the frame 105, and the frame 105 may operate as a ground of the printed circuit board 181 or the antenna module. In this instance, the frame 105 may extend the ground of the mobile terminal 100.

The printed circuit board 181 may be electrically connected to the antenna module to process wireless signals (or wireless electromagnetic waves) transmitted and received through the antenna module. For the processing of the wireless signals, a plurality of transmitting and receiving circuits (not illustrated) may be provided or installed on the printed circuit board 181.

In general, electromagnetic waves are generated during operations of the various electronic components 182 in the mobile terminal 100. The electromagnetic waves may affect a user when radiated out of the mobile terminal 100. To prevent this, the shield can 130 is used to shield (cover) those electronic components 182 so as to reduce the radiation of the electromagnetic waves to the outside of the mobile terminal 100. In this instance, the shield can 130 is made of a metal so as to allow the flow of current therealong, and the flow of current through the shield can 130 may enable the electromagnetic waves to be dissipated.

Antenna devices for implementing various frequency bands may be provided in the mobile terminal 100. The performance of each antenna device may be lowered due to electromagnetic interference (EMI) caused by the electromagnetic waves within the mobile terminal 100. In one exemplary embodiment of the present invention, a ground region extends for dissipating electromagnetic waves, generated in the mobile terminal 100, within the terminal. That is, a current may flow from the shield can 130 to the frame 105 by the ground unit 132, which may allow the electromagnetic waves generated in the mobile terminal 100 to be dissipated more fast. Accordingly, the EMI can be reduced and the antenna performance can be enhanced.

The ground unit 132 may include a contact portion 133 coming in surface-contact with the frame 105, and a connecting portion 134 connecting the shield can 130 and the contact portion 133 to each other. The ground unit 132 may be formed at the shield can 130. A region of the shield can 130 except for the ground unit 132 occupies a wide surface, and may thus be referred to as a main surface portion 131. The contact portion 133 may be in parallel to the main surface portion 131 so as to be in contact with the frame 105. The connecting portion 134 may be inclined from the main surface portion 131 toward the contact portion 133, such that the contact portion 133 is closely brought into contact with the frame 105. That is, the connecting portion 134 is a portion by which the main surface portion 131 and the contact portion 133 are connected to each other, and has elasticity. The elasticity may not refer to elasticity of a coil spring or the like, but refer to elasticity that a transformed degree is in the range of several millimeters (mm). In more detail, the contact portion 133 may protrude from the main surface portion 131 by about 0.15 mm. About 0.1 mm of the protruded portion of the contact portion 133 may overlap the frame 105. Accordingly, a gap between the main surface portion 131 and the frame 105 may be 0.05 mm. That is, the contact portion 133 may overlap the frame 105 by the connecting portion 134 having the elasticity. In other words, the gap between the frame 105 and the main surface portion 131 may be shorter than a gap between the contact portion 133 and the main surface portion 131, which is a protruded height of the contact portion 133, such that the contact portion 133 can be elastically brought into contact tightly with the frame 105.

Figure 4:
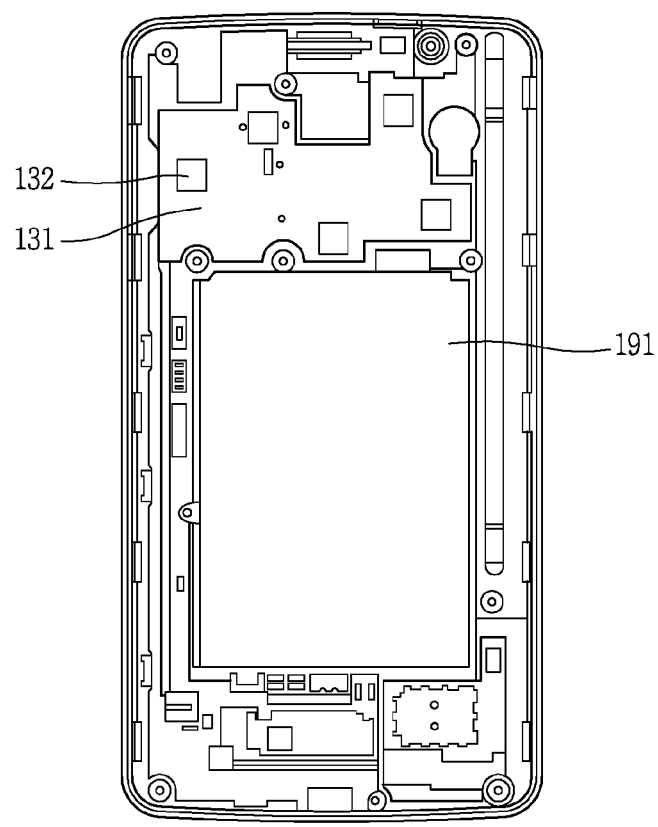
FIG. 4 is a front view of the mobile terminal without a display unit and a frame, in accordance with the one exemplary embodiment of the present invention.
Figure 5:
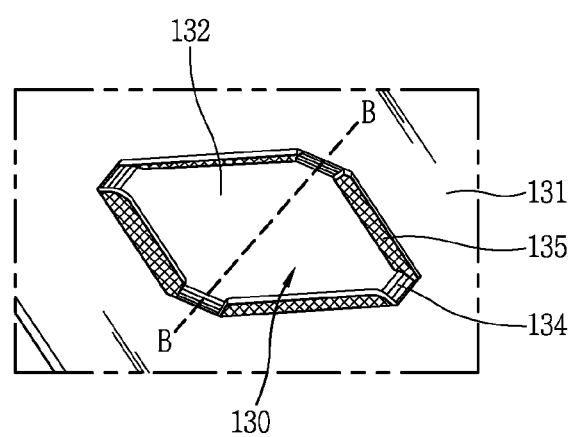
FIG. 5 is an enlarged perspective view of the ground unit in accordance with the one exemplary embodiment of the present invention.
Figure 6:
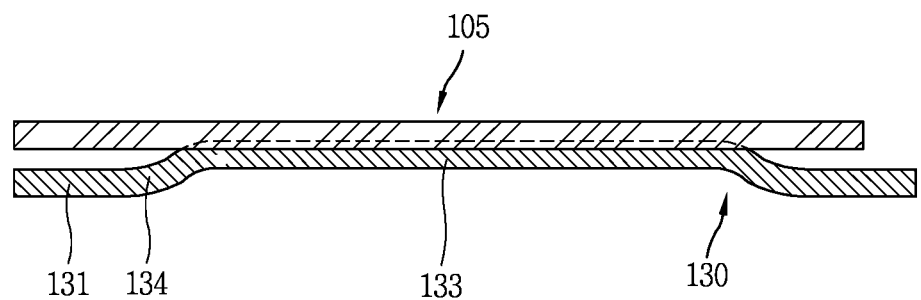
FIG. 6 is a sectional view taken along the line B-B of FIG. 5.
Figure 7:
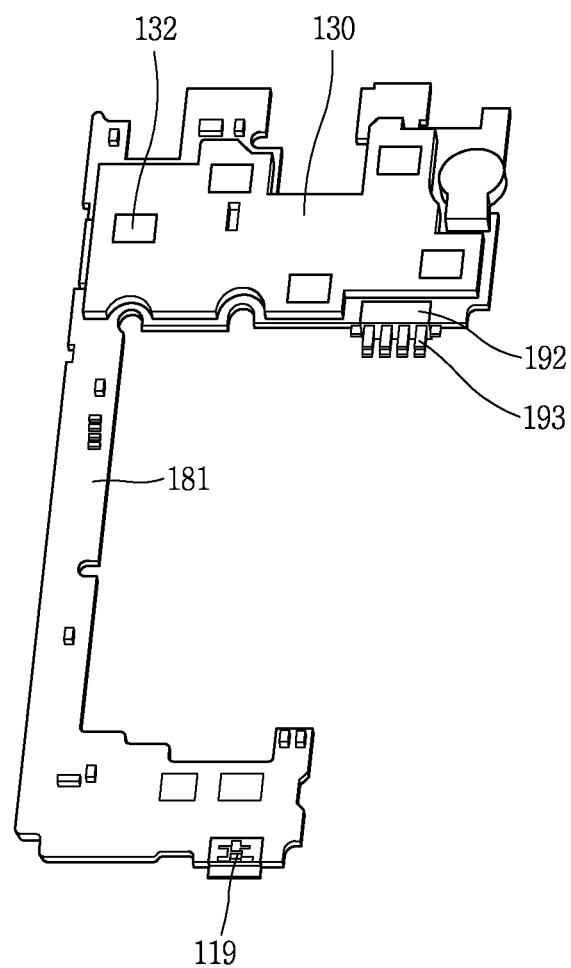
FIG. 7 is a schematic perspective view of a printed circuit board in accordance with the one exemplary embodiment of the present invention.

FIG. 4 is a front view of the mobile terminal 100 without the display unit 151 and the frame 105, in accordance with the one exemplary embodiment of the present invention, FIG. 5 is an enlarged perspective view of the ground unit 132 in accordance with the one exemplary embodiment of the present invention, FIG. 6 is a sectional view taken along the line B-B of FIG. 5, and FIG. 7 is a schematic perspective view of the printed circuit board 181 in accordance with the one exemplary embodiment of the present invention.

As illustrated in FIGS. 4 to 7, a plurality of through holes 135 may be formed through the shield can 130 in order to form the ground unit 132. A region of the ground unit 132 or the contact portion 133 may be limited by the plurality of through holes 135. The ground unit 132 may be formed at at least one region, and formed in a polygonal, circular or oval shape, or in combination thereof. That is, the ground unit 132 may be formed only in the polygonal shape, or have both of the polygonal and circular shapes.

Referring to FIG. 4, the ground unit 132 may be formed at a plurality of regions of the shield can 130 which is disposed on the printed circuit board 181. Especially, referring to FIG. 7, when the printed circuit board 181 has a shape similar to 'L' or 'C', many components 182 are mounted on an upper portion of the printed circuit board 181. In this instance, the shield can 130 is also provided on the upper portion of the printed circuit board 181 and the ground unit 132 is provided on the upper portion of the printed circuit board 181 as well.

In this instance, referring to FIG. 6, the frame 105 may be brought into contact with the contact portion 133 in an overlapping manner. The contact portion 133 may be made of a metal to facilitate a flow of current between the frame 105 and the shield can 130.

FIGS. 8A to 8G are exemplary views illustrating various shapes for the ground unit 132 in accordance with the one exemplary embodiment of the present invention.

Figure 8A:
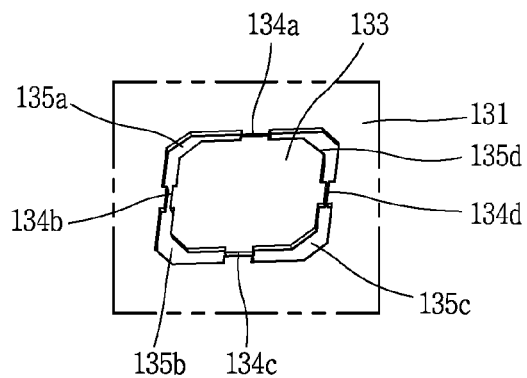
FIGS. 8A to 8G are exemplary views illustrating various shapes for the ground unit in accordance with the one exemplary embodiment of the present invention.
Figure 8B:
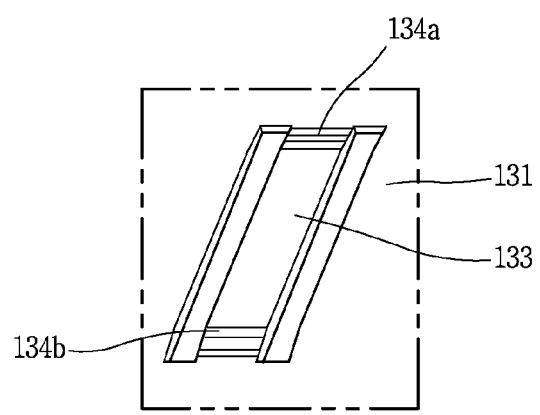
Figure 8C:
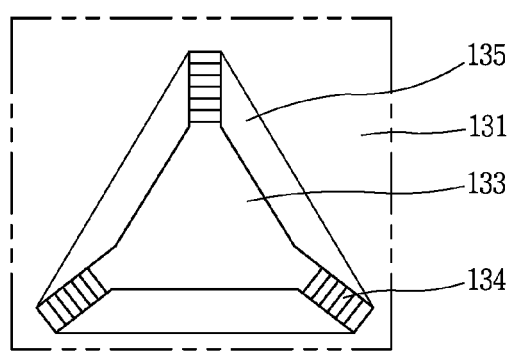
Figure 8D:
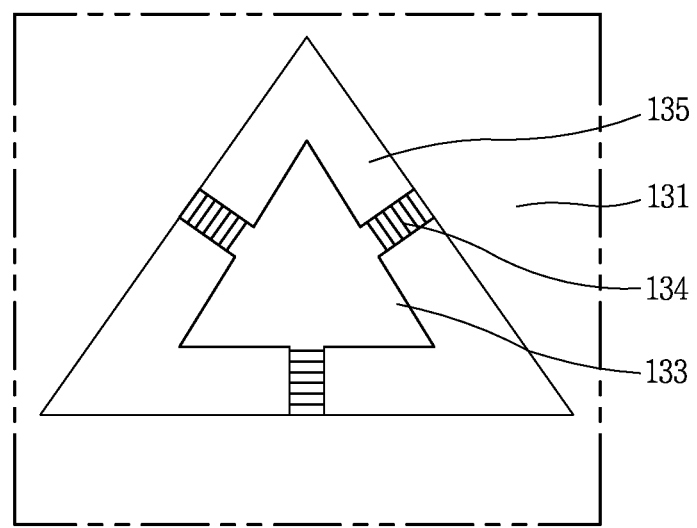
Figure 8E:
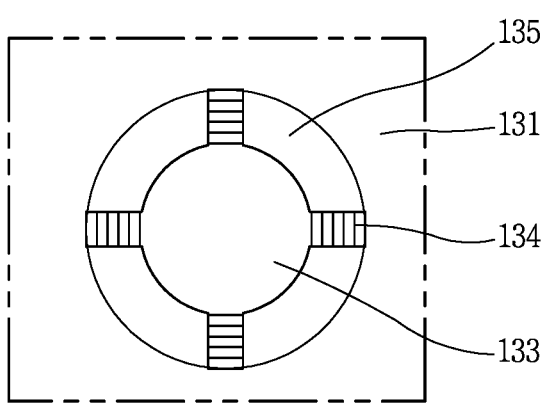
Figure 8F:
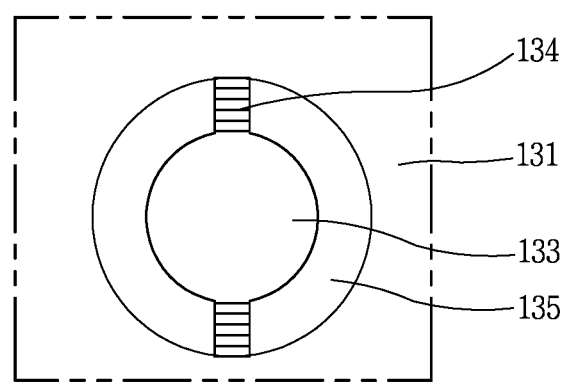
Figure 8G:
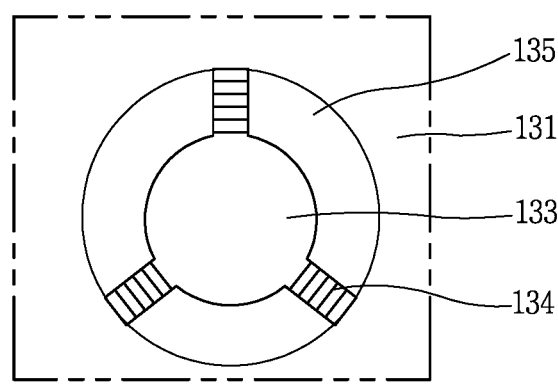

FIG. 8A illustrates an example that the ground unit 132 is formed in an approximately square shape, FIG. 8B illustrates an example that the ground unit 132 is formed in a rectangular shape, FIGS. 8C and 8D illustrate examples that the ground unit 132 is formed in a triangular shape, and FIGS. 8E to 8G illustrate examples that the ground unit 132 is formed in a circular shape.

Referring to FIG. 8A, first to fourth through holes 135a, 135b, 135c and 135d may be formed at a periphery of the contact portion 133 to form the square ground unit 132. The region of the contact portion 133 may be limited by the first to fourth through holes 135a, 135b, 135c and 135d. The contact portion 133 and the main surface portion 131 may be connected by connecting portions 134a, 134b, 134c and 134d. The connecting portions 134a, 134b, 134c and 134d may be formed at parts of edges of the contact portion 133 or at portions corresponding to vertices of the contact portion 133. Referring to FIG. 8B, the ground unit 132 may be formed in a simple manner of increasing a contact surface and forming merely two connecting portions 134a and 134b. That is, the contact portion 133 may be limited by the through holes 135 formed at both sides thereof, and both end portions thereof may be connected to the main surface portion 131 by the first and second connecting portions 134a and 134b. This shape may require for a less number of the connecting portions 134 and the through holes 135, so as to form the contact portion 133 of the ground unit 132 in a different manner from FIG. 8A.

FIGS. 8C and 8D illustrate that the contact portion 133 is in the triangular shape, different from those in FIGS. 8A and 8B. FIG. 8C illustrates that the connecting portions 134 are formed at vertices of the triangular contact portion 133, and FIG. 8D illustrates that the connecting portions 134 are formed at parts of edges of the triangular contact portion 133. In this manner, in accordance with the one exemplary embodiment of the present invention, the contact portion 133 may be formed in a polygonal shape and the connecting portions 134 may be formed at the vertices or the parts of the edges of the contact portion 133.

In addition, referring to FIGS. 8E to 8G, the contact portion 133 may be formed in a circular shape or an oval shape. Even in these instances, two or more of the connecting portions 134 may be provided to connect the contact portion 133 and the main surface portion 131. As illustrated in FIGS. 8E to 8G, the connecting portions 134 may be formed to have the same angle from a center of the contact portion 133. For example, the connecting portions 134 may be formed at portions forming 90°, 120° and 180° from a center of a circle. This may equally be applied even to the example that the contact portion 133 is in the oval shape.

In this manner, the connecting portions 134 may be formed symmetric based on the center of the contact portion 133. This may allow a current to uniformly flow through the contact portion 133.

Figure 9:
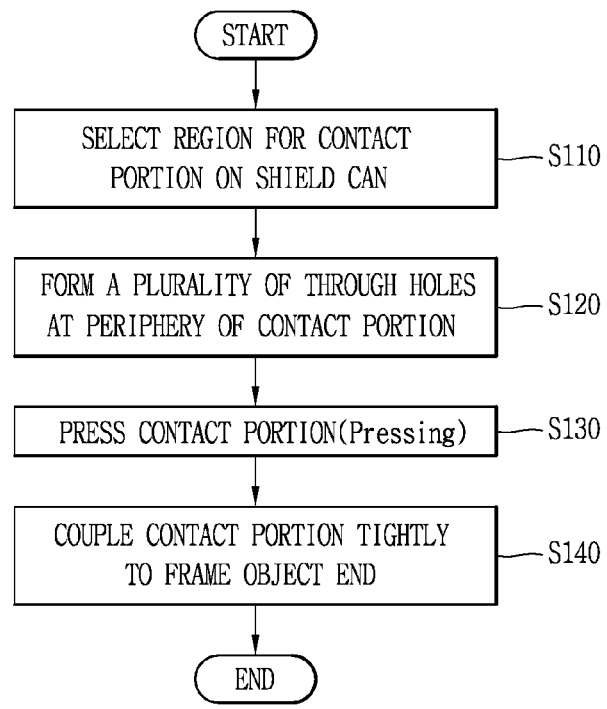
FIG. 9 is a flowchart illustrating sequential steps of fabricating a mobile terminal in accordance with one exemplary embodiment of the present invention.

Meanwhile, FIG. 9 is a flowchart illustrating sequential steps of fabricating a mobile terminal in accordance with one exemplary embodiment of the present invention. Hereinafter, description will be given with reference to FIG. 9.

A method for fabricating the mobile terminal according to one exemplary embodiment is the same as a fabricating method of a general mobile terminal, except for a process of forming the shield can 130. Hereinafter, description will mainly be given of the process of fabricating the shield can 130.

In the one exemplary embodiment of the present invention, the surface of the shield can 130 which shields those electronic components 182 does not have a simply flat shape. The contact portion 133 of the ground unit 132 protrudes toward the frame 105, and the through holes 135 are formed around the contact portion 133 to help the protrusion of the contact portion 133. That is, a region for forming the contact portion 133 may be selected on the shield can 130 (S110), and the plurality of through holes 135 may be formed at a periphery of the selected region for forming the contact portion 133 (S120). Accordingly, the connecting portions 134 by which the contact portion 133 and the main surface portion 131 of the shield can 130 are electrically connected may be formed.

The contact portion 133 may have a predetermined area. Also, since the contact portion 133 is a component for preventing electromagnetic waves generated from those electronic components 182 provided within the shield can 130 from being leaked out of the mobile terminal 100, the contact portion 133 may preferably be disposed without overlapping those electronic components 182. However, the shield can 130 is disposed for the purpose of blocking the electromagnetic waves. Accordingly, if the contact portion 133 is formed to overlap the electronic components 182 generating strong electromagnetic waves, the original purpose of forming the shield can 130 to block the electromagnetic waves may not be achieved. Therefore, the selection of the region to form the contact portion 133 is important.

When the formation region of the contact portion 133 is selected, a shape of the contact portion 133 should be decided. For example, when the contact portion 133 has the square shape as illustrated in FIG. 8A and the connecting portions 134 are formed at the parts of the edges of the contact portion 133, the contact portion 133 should be formed at a region limited by the connecting portions 134a, 134b, 134d and 134d and the first to fourth through holes 135a, 135b, 135c and 135d.

Afterwards, the contact portion 133 may be pressed in a punching manner (S130). The contact portion 133 may protrude in one direction by the punching and the connecting portions 134 may be formed to connect the main surface portion 131 and the contact portion 133. In this instance, the connecting portions 134 may have some elasticity. The contact portion 133 may protrude from the main surface portion 131.

In this instance, after the ground unit 132 is formed at the shield can 130, the mobile terminal 100 may be assembled according to a typical assembling procedure. Here, the contact portion 133 may be coupled to the frame 105 in a closely-adhering (or overlapping) manner (S140). Accordingly, the shield can 130 having the ground unit 132 may be assembled to the mobile terminal 100.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a frame made of a metal and provided within a terminal body;
   a printed circuit board spaced apart from one surface of the frame and having various electronic components mounted thereon; and
   a shield can disposed on the printed circuit board in a manner of facing the frame, and capable of shielding electromagnetic waves by covering the electronic components,
   wherein the shield can is provided with a ground unit that is formed on at least one region and protruding toward the frame so as to be electrically connected to the frame,
   wherein the ground unit comprises:
   a contact portion brought into surface-contact with the frame; and
   a connecting portion connecting the shield can and the contact portion to each other, and
   wherein the connecting portion is provided by at least one connection portion, the connecting portion extending from a main surface portion of the shield can, and
   wherein through holes are formed between the ground unit and the main surface portion, and
   wherein the contact portion is formed parallel to the main surface portion.

2. The terminal of claim 1, wherein the connecting portion is inclined from the main surface portion toward the contact portion.

3. The terminal of claim 1, wherein the terminal body comprises:
a front case supporting a display unit;
a rear case provided beneath the front case to limit an installation space of a plurality of components along with the front case; and
a rear cover covering a rear surface of the rear case,
wherein the frame is integrally formed with the front case.

4. The terminal of claim 1, wherein the connecting portion is symmetric based on a center of the contact portion.

5. The terminal of claim 1, wherein the contact portion is formed in a polygonal, circular or oval shape, or in combination thereof.

6. The terminal of claim 5, wherein the connecting portion is formed at each of edges or vertices of the polygon when the contact portion has the polygonal shape.

7. The terminal of claim 5, wherein each of the connecting portions is formed to have the same angle from a center of the circle or oval when the contact portion has the circular or oval shape.

* * * * *